(12) United States Patent
Xu et al.

(10) Patent No.: US 12,344,195 B2
(45) Date of Patent: Jul. 1, 2025

(54) STEP DEVICE AND VEHICLE HAVING SAME (71) Applicant: T-MAX (HANGZHOU) TECHNOLOGY CO., LTD., Zhejiang (CN)

(72) Inventors: Linjie Xu, Zhejiang (CN); Qi Zhang, Zhejiang (CN); Hanxin Zhang, Zhejiang (CN); Chao Luo, Zhejiang (CN)

(73) Assignee: T-MAX (HANGZHOU) TECHNOLOGY CO., LTD., Hangzhou (CN)

( * ) Notice: Subject to any disclaimer, the term of this patent is extended or adjusted under 35 U.S.C. 154(b) by 309 days.

(21) Appl. No.: 17/975,009

(22) Filed: Oct. 27, 2022

(65) Prior Publication Data
US 2023/0391262 A1 Dec. 7, 2023

(30) Foreign Application Priority Data

Jun. 6, 2022 (CN) .......................... 202210631509.0
Jun. 6, 2022 (CN) .......................... 202221412578.4

(51) Int. Cl.
*B60R 3/02* (2006.01)
(52) U.S. Cl.
CPC ....................................... *B60R 3/02* (2013.01)
(58) Field of Classification Search
CPC ....................................................... B60R 3/02
See application file for complete search history.

(56) References Cited

U.S. PATENT DOCUMENTS

| 2,825,582 | A | * | 3/1958 | McDonald | ................ B60R 3/02 182/91 |
| 6,082,751 | A | * | 7/2000 | Hanes | ....................... B60R 3/02 280/169 |
| 9,688,205 | B2 | * | 6/2017 | Du | ........................... B60R 3/02 |
| 10,384,614 | B1 | * | 8/2019 | Du | ........................... B60R 3/02 |
| 11,414,017 | B2 | * | 8/2022 | Qing | ........................ B60R 3/02 |
| 2019/0084482 | A1 | * | 3/2019 | Long | ...................... B60R 3/002 |

(Continued)

FOREIGN PATENT DOCUMENTS

| CN | 207790503 U | 8/2018 |
| CN | 109910763 A | 6/2019 |

(Continued)

OTHER PUBLICATIONS

English translation of the Written Opinion of the International Searching Authority dated Feb. 22, 2023 for corresponding International Application No. PCT/CN2022/109541, filed Aug. 1, 2022.

*Primary Examiner* — Brian L Swenson
(74) *Attorney, Agent, or Firm* — David D. Brush; Westman, Champlin & Koehler, P.A.

(57) ABSTRACT

A step device includes: a mounting seat including a limiting part and configured to be mounted to a vehicle body; a step seat including an engaging part; a step mounted on the step seat; and an extension and retraction assembly connected to the mounting seat and the step seat, the extension and retraction assembly being configured to drive the step seat to move between an extended position where the engaging part is separated from the limiting part and a retracted position where the engaging part is engaged with the limiting part.

19 Claims, 5 Drawing Sheets

(56) References Cited

U.S. PATENT DOCUMENTS

| | | | | |
|---|---|---|---|---|
| 2020/0023780 A1* | 1/2020 | Du | ........................ | B60R 3/002 |
| 2020/0047674 A1* | 2/2020 | Du | ........................ | F16H 37/041 |
| 2020/0331396 A1* | 10/2020 | Du | ........................ | B60Q 1/323 |
| 2022/0281548 A1* | 9/2022 | Kaeb | ........................ | B60R 9/02 |

FOREIGN PATENT DOCUMENTS

| | | | |
|---|---|---|---|
| CN | 114475439 A | 5/2022 | |
| EP | 2418124 A1 | 2/2012 | |
| JP | 2019137385 A | 8/2019 | |

* cited by examiner

STEP DEVICE AND VEHICLE HAVING SAME

CROSS-REFERENCE TO RELATED APPLICATIONS

This application is based on and claims priority to the Chinese Patent Application Nos. 202210631509.0 and 202221412578.4 filed on Jun. 6, 2022, the entire contents of which are incorporated herein by reference.

TECHNICAL FIELD

The present disclosure relates to a field of vehicle steps, and more particularly to a step device and a vehicle having the same.

BACKGROUND

A vehicle step is usually mounted under a vehicle door to assist a passenger in getting in and out of the vehicle. When the vehicle passes through a road section with obstacles on its side, the obstacles first collides with a step mechanism, and thus causes the step mechanism to be deformed due to squeeze. In the case that the step mechanism is subject to an impact force, the step will transmit the impact force to a connecting mechanism of the step, which tends to cause the breakage of the connecting mechanism, and then cause the step to continue being squeezed towards the vehicle body, so that the side of the vehicle body is deformed and damaged, thus increasing the post-maintenance cost of the vehicle.

SUMMARY

According to a first aspect of the present disclosure, a step device is provided and includes: a mounting seat including a limiting part and configured to be mounted to a vehicle body; a step seat including an engaging part; a step mounted on the step seat; and an extension and retraction assembly connected to the mounting seat and the step seat, the extension and retraction assembly being configured to drive the step seat to move between an extended position where the engaging part is separated from the limiting part and a retracted position where the engaging part is engaged with the limiting part.

According to a second aspect of the present disclosure, a vehicle is provided and includes a step device. The step device includes: a mounting seat including a limiting part and configured to be mounted to a vehicle body; a step seat including an engaging part; a step mounted on the step seat; and an extension and retraction assembly connected to the mounting seat and the step seat, the extension and retraction assembly being configured to drive the step seat to move between an extended position where the engaging part is separated from the limiting part and a retracted position where the engaging part is engaged with the limiting part.

DETAILED DESCRIPTION

Embodiments of the present disclosure are described in detail below, and examples of the embodiments are shown in accompanying drawings. The following embodiments described with reference to the accompanying drawings are exemplary and are intended to explain the present disclosure and cannot be understood as limitations on the present disclosure.

A step device and a vehicle having the same according to embodiments of the present disclosure are described below with reference to FIGS. 1 to 8.

Figure 1:
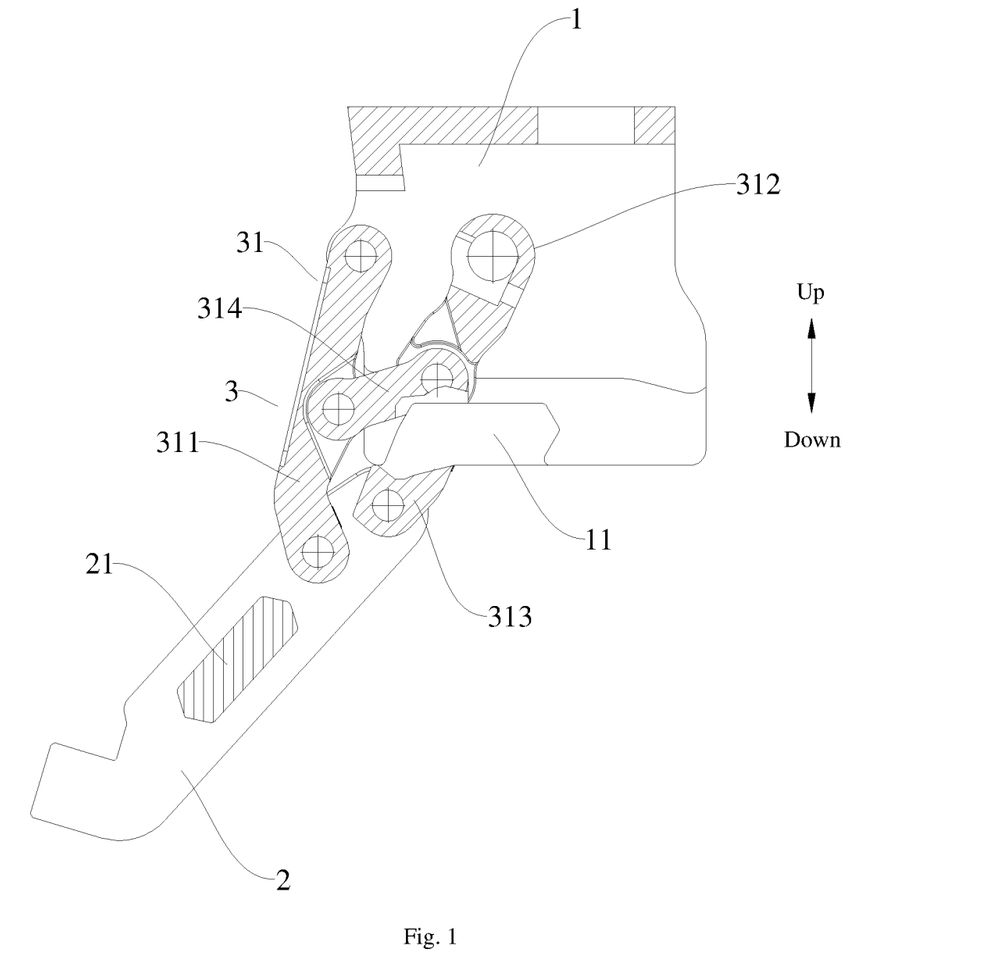
FIG. 1 is a sectional view of a step device in an extended position according to an embodiment of the present disclosure.
Figure 2:
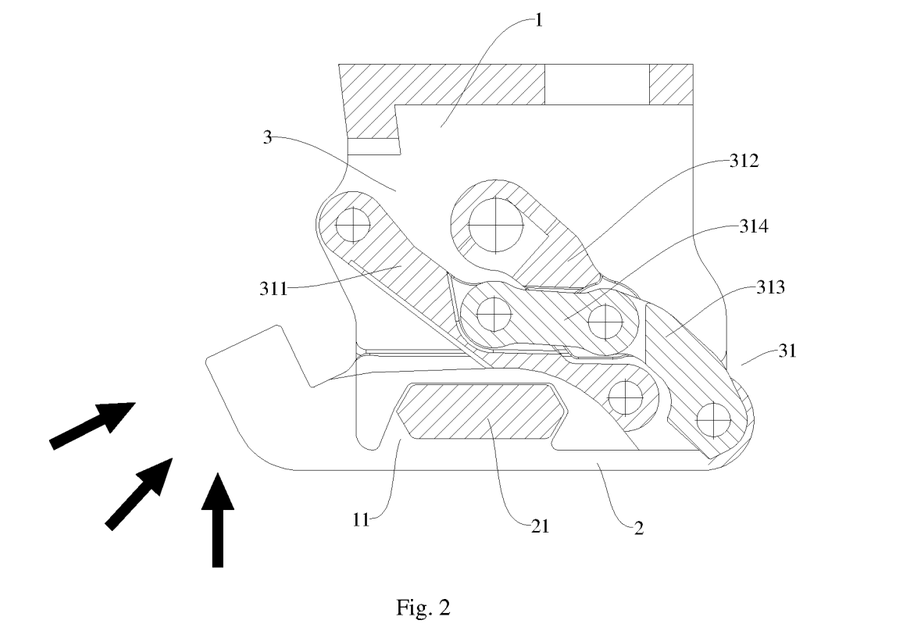
FIG. 2 is a sectional view of a step device in a retracted position according to an embodiment of the present disclosure.
Figure 3:
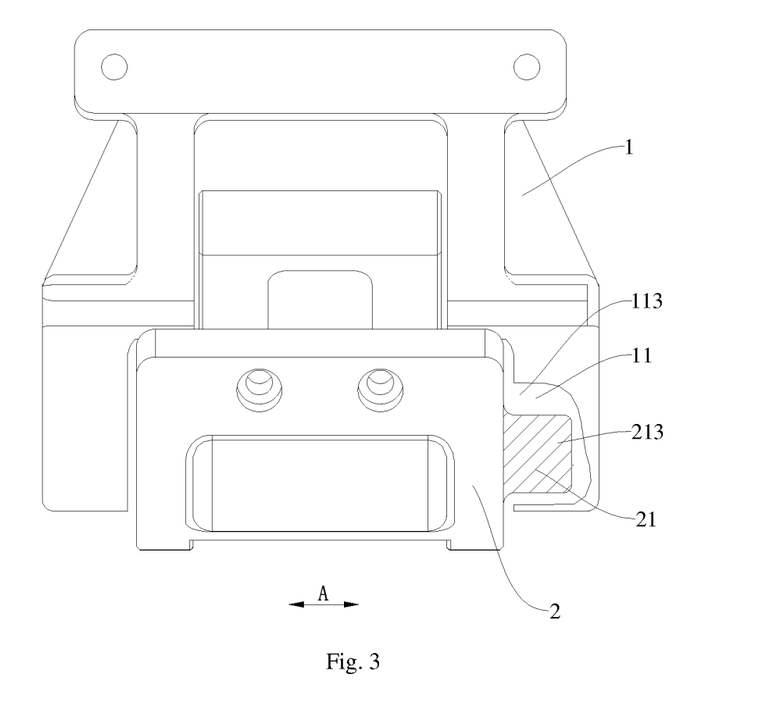
FIG. 3 is a front view of a step device according to an embodiment of the present disclosure.

As shown in FIGS. 1 and 2, the step device according to the embodiments of the present disclosure includes a mounting seat 1, a step seat 2 and an extension and retraction assembly 3, the mounting seat 1 includes a limiting part 11 and is suitable to be mounted to a vehicle body, and the step seat 2 includes an engaging part 21 and is used for mounting a step. The extension and retraction assembly 3 is connected to the mounting seat 1 and the step seat 2, and used to drive the step seat 2 to move between an extended position and a retracted position. In the extended position, the engaging part 21 is separated from the limiting part 11, and when the step seat 2 is in the retracted position, the engaging part 21 is engaged with the limiting part 11.

In the step device according to the embodiments of the present disclosure, the step seat 2 can be driven by the extension and retraction assembly 3 to move between the extended position and the retracted position, and when the step seat 2 is in the retracted position, the engaging part 21 is engaged with the limiting part 11, so that when the step seat 2 is subject to an impact force in a horizontal direction, the impact force can be directly transmitted to the mounting seat 1 through the interaction of the engaging part 21 and the limiting part 11, so as to absorb the impact force, thus preventing further squeeze deformation of the extension and retraction assembly 3, the step seat 2 or other mechanisms, reducing the problem of damage of the step device due to collision, improving the connection strength of the step device, and decreasing the post-maintenance cost.

For example, the extension and retraction assembly 3 can be detachably connected to the mounting seat 1 and the step seat 2 through a pin, and the extension and retraction assembly 3 can be rotated relative to the mounting seat 1 and the step seat 2, thus facilitating the assembling and processing of the step device. Moreover, it is convenient to assemble and disassemble the step device, thus facilitating the post-maintenance work.

It can be understood that, as shown in FIGS. 1 and 2, the step seat 2 is located below the mounting seat 1. When the step device is in the extended position, the step seat 2 extends obliquely downwards out of the mounting seat 1.

When the step device (i.e. the step seat 2) is in the retracted position, the step seat 2 is retracted to be right below the seat mounting 1, and the engaging part 21 is retracted into the limiting part 11, so that the step seat 2 and the mounting seat 1 are closely fitted into an integral structure. Thus, when the step seat 2 is subject to the impact force, the mounting seat 1 absorbs the impact force, so as to prevent the extension and retraction assembly 3 from being further deformed or broken, thus improving the anti-collision effect of the step device.

In some embodiments, as shown in FIGS. 1 and 2, one of the limiting part 11 and the engaging part 21 is a bump 213, and the other one of the limiting part 11 and the engaging part 21 is a groove 113. When the step seat 2 is in the retracted position, the bump 213 is fitted in the groove 113. For example, in the embodiments of the present disclosure, the engaging part 21 is the bump 213, and the limiting part 11 is the groove 113. In the step device according to the embodiments of the present disclosure, by configuring the limiting part 11 and the engaging part 21 as the above structures, the connection of the step seat 2 and the mounting seat 1 is more reliable when the step device (i.e. the step seat 2) is in the retracted position, and the design of the structure is simple, which facilitates the processing and manufacturing.

In some embodiments, as shown in FIGS. 5 to 8, the bump 213 has a cross section of one of a polygonal shape, a waist shape and a circular shape. It can be understood that the cross section of the bump 213 may have a parallelogram shape, a hexagonal shape, a waist shape or a circular shape. Correspondingly, a peripheral contour of the groove 113 matches with a peripheral contour of the cross section of the bump 213, so that the bump 213 does not tend to be separated out of the groove 113, thus making the connection of the step device more reliable.

Figure 8:
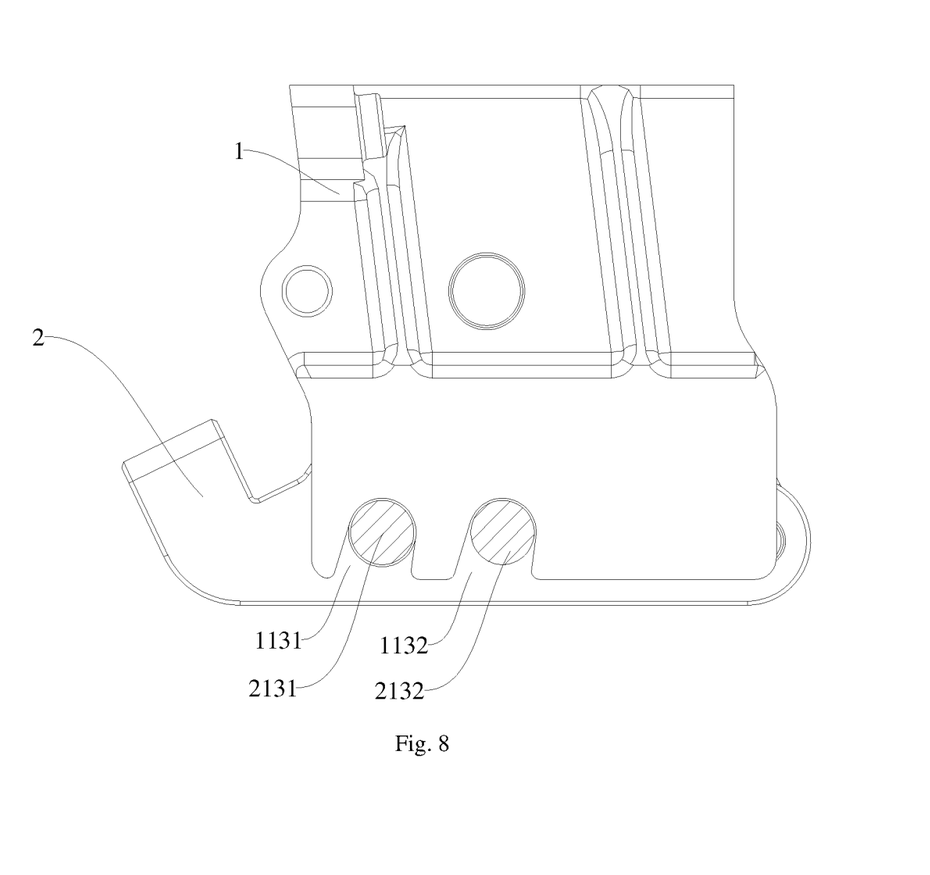
FIG. 8 is a schematic view of mounting of a limiting part and an engaging part of a step device according to yet another embodiment of the present disclosure.

Specifically, as shown in FIG. 8, the limiting part 11 includes a first groove 1131 and a second groove 1132, and the engaging part 21 includes a first bump 2131 and a second bump 2132. When the step seat 2 is in the retracted position, the first bump 2131 is fitted in the first groove 1131, and the second bump 2132 is fitted in the second groove 1132. It can be understood that two bumps 213 and two grooves 113 are provided correspondingly, the two grooves 113 are arranged at intervals on the mounting seat 1, and the two bumps 213 are arranged at intervals on the step seat 2.

When the step seat 2 is in the retracted position, as shown in FIG. 8, the two bumps 213 are embedded in the two grooves 113, respectively, so that the connection of the step device is more stable. It can be understood that the step device according to the embodiments of the present disclosure may include a plurality of grooves 113 and a plurality of bumps 213, so that the step device has a plurality of anti-collision points, thereby further reducing the problem of damage of the step device due to collision, and improving the connection strength of the step device.

Figure 4:
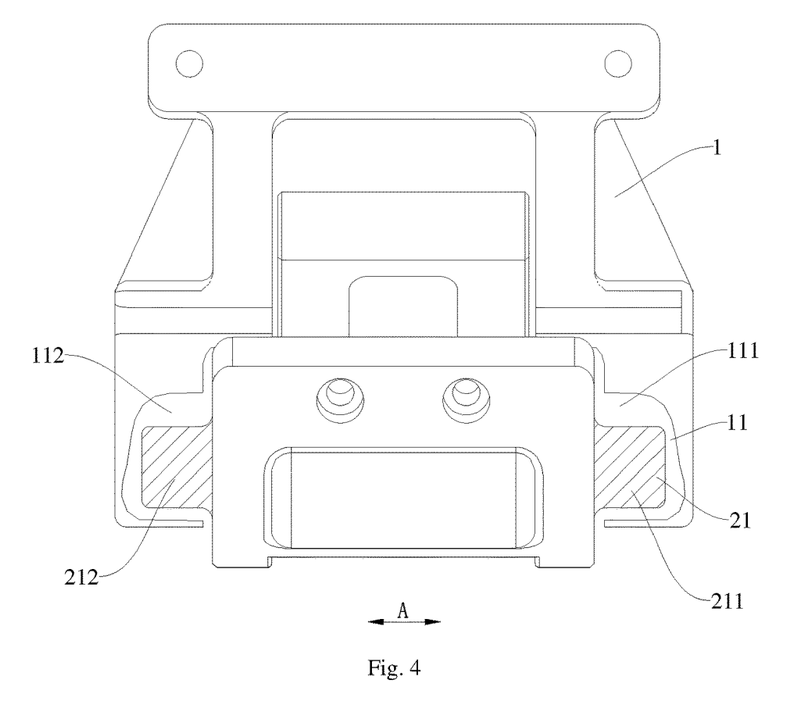
FIG. 4 is another front view of a step device according to an embodiment of the present disclosure.
Figure 5:
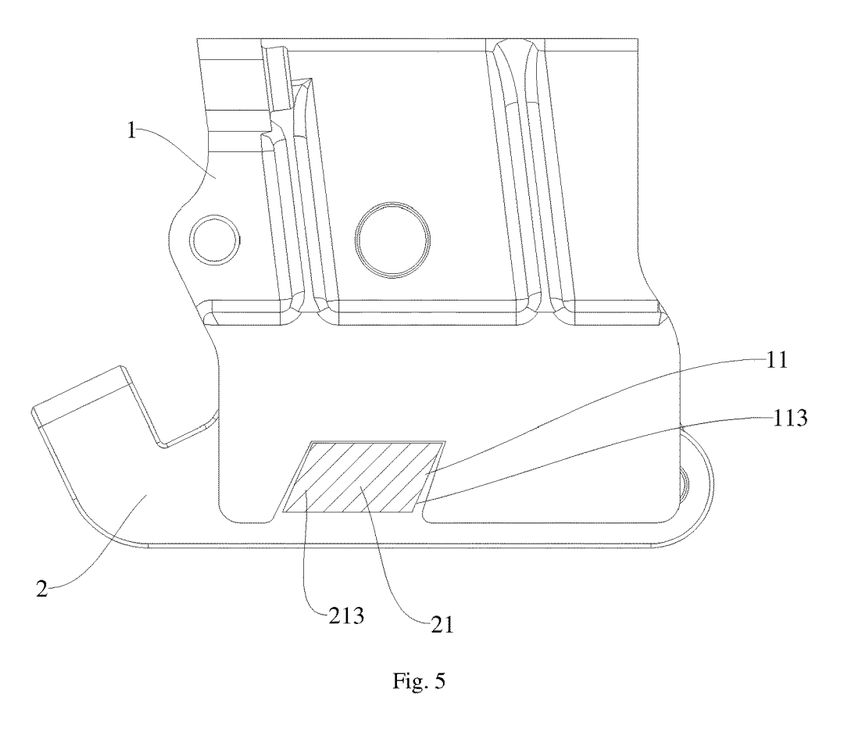
FIG. 5 is a schematic view of mounting of a limiting part and an engaging part of a step device according to an embodiment of the present disclosure.
Figure 6:
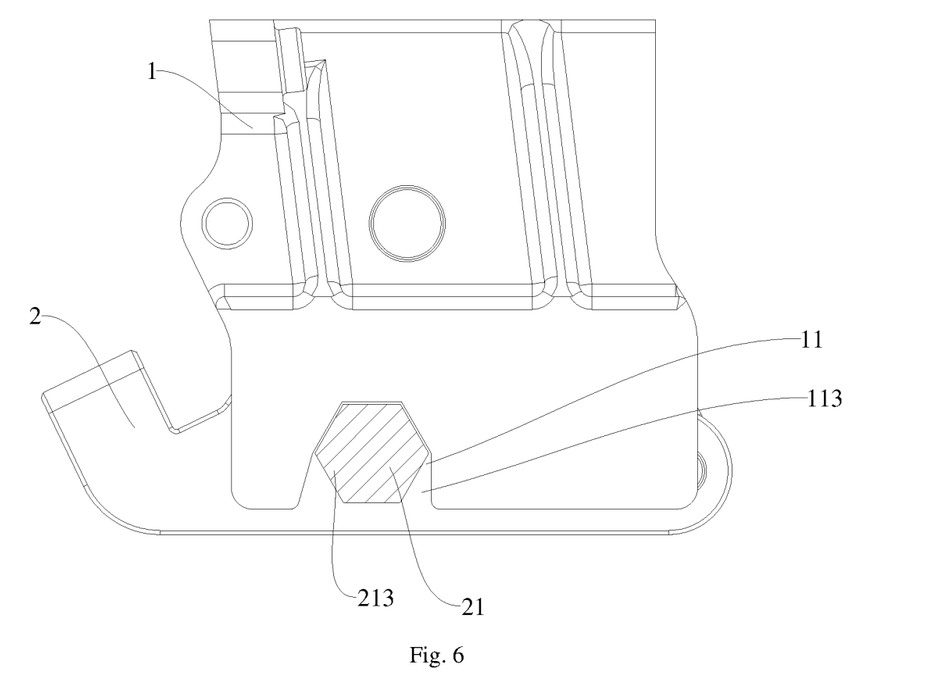
FIG. 6 is a schematic view of mounting of a limiting part and an engaging part of a step device according to another embodiment of the present disclosure.
Figure 7:
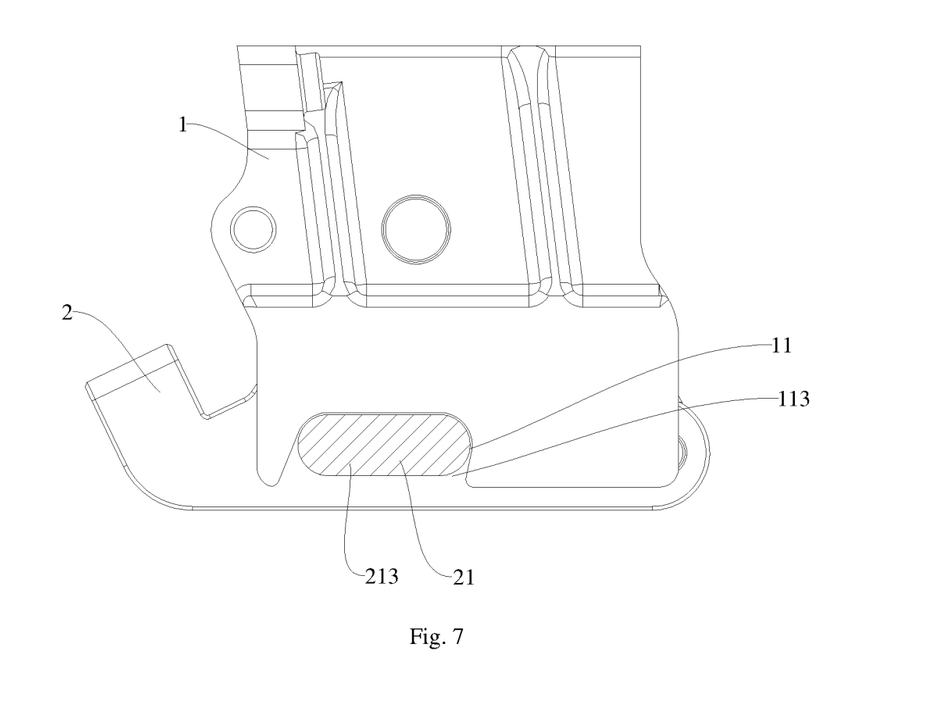
FIG. 7 is a schematic view of mounting of a limiting part and an engaging part of a step device according to still another embodiment of the present disclosure.

In some embodiments, as shown in FIG. 4, the limiting part 11 includes a first limiting part 111 and a second limiting part 112, the engaging part 21 includes a first engaging part 211 and a second engaging part 212, the first engaging part 211 and the second engaging part 212 are located on two opposite sides of the step seat 2 along a length direction of the step seat 2 (for example, a direction A in FIG. 4), and the first limiting part 111 and the second limiting part 112 are in a one-to-one correspondence with the first engaging part 211 and the second engaging part 212. That is, the first limiting part 111 and the second limiting part 112 are arranged on two opposite sides of the mounting seat 1. In the step device according to the embodiments of the present disclosure, the first limiting part 111 and the second limiting part 112 are arranged on two opposite sides of the mounting seat 1, and the first engaging part 211 and the second engaging part 212 are arranged on the two opposite sides of the step seat 2, so that the anti-collision effect of the step device is better, thus further improving the service life of the step device, and reducing the post-maintenance cost of the step device.

In some embodiments, as shown in FIGS. 1 and 2, the extension and retraction assembly 3 includes two linkage mechanisms 31 and a driving member (not shown), and the two linkage mechanisms 31 are arranged at intervals along the length direction of the step seat 2. For example, the driving member is a motor. The driving member is connected to the linkage mechanism 31 to drive the linkage mechanism 31 to move, so as to control the step seat 2 to extend or retract, thus improving the stability of movement of the step device.

In some embodiments, the extension and retraction assembly 3 is a four-bar linkage mechanism. The linkage mechanism 31 includes a first bar 311 and a second bar 312. A first end of the first bar 311 (for example, an upper end of the first bar 311) is pivotably connected to the mounting seat 1, and a second end of the first bar 311 (for example, a lower end of the first bar 311) is pivotably connected to the step seat 2. A first end of the second bar 312 (for example, an upper end of the second bar 312) is pivotably connected to the mounting seat 1, and a second end of the second bar 312 (for example, a lower end of the second bar 312) is pivotably connected to the step seat 2.

It can be understood that one of the first bar 311 and the second bar 312 is connected to the driving member, so that the driving member can drive the one of the first bar 311 and the second bar 312 to rotate, thus finally transmitting the power to the step seat 2 to drive the step seat 2 to extend and retract.

In some embodiments, the extension and retraction assembly 3 is a five-bar linkage mechanism. The linkage mechanism 31 includes a first bar 311, a second bar 312 and a third bar 313. A first end of the first bar 311 (for example, an upper end of the first bar 311) is pivotably connected to the mounting seat 1, a second end of the first bar 311 (for example, a lower end of the first bar 311) is pivotably connected to the step seat 2, a first end of the second bar 312 (for example, an upper end of the second bar) is pivotably connected to the mounting seat 1, a first end of the third bar 313 (for example, an upper end of the third bar 313) and a second end of the second bar 312 (for example, a lower end of the second bar 312) are pivotably connected, and a second end of the third bar 313 (for example, a lower end of the third bar 313) is pivotably connected to the step seat 2.

It can be understood that one of the first bar 311 and the second bar 312 is connected to the driving member, so that the driving member can drive the one of the first bar 311 and the second bar 312 to rotate, thus finally transmitting the power to the step seat 2 to drive the step seat 2 to extend and retract.

In some embodiments, as shown in FIGS. 1 and 2, the extension and retraction assembly 3 is a six-bar linkage mechanism, and the linkage mechanism 31 includes a first bar 311, a second bar 312, a third bar 313 and a fourth bar 314. A first end of the first bar 311 (for example, an upper end of the first bar 311 in FIG. 1) is pivotably connected to the mounting seat 1, a second end of the first bar 311 (for example, a lower end of the first bar 311 in FIG. 1) is pivotably connected to the step seat 2, a first end of the second bar 312 (for example, an upper end of the second bar 312 in FIG. 1) is pivotably connected to the mounting seat 1, a second end of the second bar 312 (for example, a lower end of the second bar 312 in FIG. 1), a first end of the third bar 313 (for example, an upper end of the third bar 313 in FIG. 1) and a first end of the fourth bar 314 (for example, an upper end of the fourth bar 314 in FIG. 1) are pivotably connected, a second end of the third bar 313 (for example, a lower end of the third bar 313 in FIG. 1) is pivotably connected to the step seat 2, and a second end of the fourth bar 314 (for example, a lower end of the fourth bar 314 in FIG. 1) is pivotably connected to a middle portion of the first bar 311.

It can be understood that one of the first bar 311 and the second bar 312 is connected to the driving member, so that the driving member can drive the one of the first bar 311 and the second bar 312 to rotate, thus finally transmitting the power to the step seat 2 to drive the step seat 2 to extend and retract.

The vehicle according to another embodiment of the present disclosure includes a step device and a vehicle body, and the step device is the step device according to the embodiments of the present disclosure. The step device further includes a step (not shown), the step is mounted on the step seat 2, and the mounting seat 1 is mounted on the vehicle body.

In the vehicle according to the embodiment of the present disclosure, the step seat 2 can be driven by the extension and retraction assembly 3 to move between the extended position and the retracted position, and when the step seat 2 is in the retracted position, the engaging part 21 is engaged with the limiting part 11, so that when the step seat 2 is subject to an impact force in a horizontal direction, the impact force can be directly transmitted to the mounting seat 1 through the interaction of the engaging part 21 and the limiting part 11, so as to absorb the impact force, thus preventing further squeeze deformation of the extension and retraction assembly 3, the step seat 2 or other mechanisms, reducing the problem of damage of the step device due to collision, improving the connection strength of the step device, and decreasing the post-maintenance cost.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "peripheral" should be construed to refer to the orientation and position as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In addition, terms "first" and "second" are only used for descriptive purposes and cannot be understood as indicating or implying relative importance or implicitly indicating the number of indicated technical features. Thus, the features defined by "first" and "second" may include at least one of the features explicitly or implicitly. In the description of the present disclosure, "a plurality of" means at least two such as two or three, unless otherwise expressly and specifically defined.

In the present disclosure, unless otherwise expressly defined, terms such as "mounting," "interconnection," "connection," "fixing" shall be understood broadly, and may be, for example, fixed connections, detachable connections, or integral connections; may also be mechanical or electrical connections or intercommunication; may also be direct connections or indirect connections via intervening media; may also be inner communications or interactions of two elements. For those skilled in the art, the specific meaning of the above terms in the present disclosure can be understood according to the specific situations.

In the present disclosure, unless otherwise expressly defined and specified, a structure in which a first feature is "on" or "below" a second feature may include an embodiment in which the first feature is in direct contact with the second feature, or may further include an embodiment in which the first feature and the second feature are in indirect contact through intermediate media. Furthermore, a first feature "on," "above," or "on top of" a second feature may include an embodiment in which the first feature is right or obliquely "on," "above," or "on top of" the second feature, or just means that the first feature is at a height higher than that of the second feature, while a first feature "below," "under," or "on bottom of" a second feature may include an embodiment in which the first feature is right or obliquely "below," "under," or "on bottom of" the second feature, or just means that the first feature is at a height lower than that of the second feature.

In the description of the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation to the present disclosure, and changes, modifications, alternatives and variations can be made in the above embodiments within the scope of the present disclosure by those skilled in the art.

The invention claimed is:
1. A step device for a vehicle, comprising:
a mounting seat including a limiting part and configured to be mounted to a vehicle body of the vehicle;
a step seat comprising an engaging part;
a step mounted on the step seat; and
an extension and retraction assembly connected to the mounting seat and the step seat, the extension and retraction assembly being configured to drive the step seat to move between an extended position where the engaging part is separated from the limiting part and a retracted position where the engaging part is engaged with the limiting part;
wherein the limiting part comprises a first limiting part and a second limiting part, the engaging part comprises a first engaging part and a second engaging part, the first engaging part and the second engaging part are arranged on two opposite sides of the step seat along a length direction of the step seat, and the first limiting part and the second limiting part are in a one-to-one correspondence with the first engaging part and the second engaging part.

2. The step device according to claim 1, wherein one of the limiting part and the engaging part is a bump, the other one of the limiting part and the engaging part is a groove, and the bump is fitted in the groove when the step seat is in the retracted position.

3. The step device according to claim 2, wherein the bump has a cross section of one of a polygonal shape, a waist shape and a circular shape.

4. The step device according to claim 2, wherein each limiting part comprises a first groove and a second groove, and each engaging part comprises a first bump and a second bump; when the step seat is in the retracted position, the first bump is fitted in the first groove and the second bump is fitted in the second groove.

5. The step device according to claim 1, wherein the extension and retraction assembly comprises two linkage mechanisms, and the two linkage mechanisms are arranged at intervals along a length direction of the step seat.

6. The step device according to claim 5, wherein each linkage mechanism comprises:
a first bar having a first end pivotably connected to the mounting seat and a second end pivotably connected to the step seat; and
a second bar having a first end pivotably connected to the mounting seat and a second end pivotably connected to the step seat.

7. The step device according to claim 5, wherein each linkage mechanism comprises:
a first bar having a first end pivotably connected to the mounting seat and a second end pivotably connected to the step seat;
a second bar having a first end pivotably connected to the mounting seat and a second end; and
a third bar having a first end pivotably connected to the second end of the second bar and a second end pivotably connected to the step seat.

8. The step device according to claim 5, wherein each linkage mechanism comprises:
a first bar having a first end pivotably connected to the mounting seat and a second end pivotably connected to the step seat;
a second bar having a first end pivotably connected to the mounting seat and a second end; and
a third bar and a fourth bar, each having a first end and a second end, the second end of the second bar, the first end of the third bar and the first end of the fourth bar being pivotably connected, the second end of the third bar being pivotably connected to the step seat, and the second end of the fourth bar being pivotably connected to a middle portion of the first bar.

9. The step device according to claim 1, wherein the extension and retraction assembly is detachably connected to the mounting seat and the step seat by a pin, and the extension and retraction assembly is rotatable relative to the mounting seat and the step seat.

10. The step device according to claim 5, further comprising a driving member connected to the linkage mechanisms to drive the linkage mechanisms to move.

11. A vehicle, comprising a step device, wherein the step device comprises:
a mounting seat including a limiting part and configured to be mounted to a vehicle body of the vehicle;
a step seat comprising an engaging part;
a step mounted on the step seat; and
an extension and retraction assembly connected to the mounting seat and the step seat, the extension and retraction assembly being configured to drive the step seat to move between an extended position where the engaging part is separated from the limiting part and a retracted position where the engaging part is engaged with the limiting part;
wherein the limiting part comprises a first limiting part and a second limiting part, the engaging part comprises a first engaging part and a second engaging part, the first engaging part and the second engaging part are arranged on two opposite sides of the step seat along a length direction of the step seat, and the first limiting part and the second limiting part are in a one-to-one correspondence with the first engaging part and the second engaging part.

12. The vehicle according to claim 11, further comprising a vehicle body, wherein the mounting seat is mounted on the vehicle body.

13. The vehicle according to claim 11, wherein one of the limiting part and the engaging part is a bump, the other one of the limiting part and the engaging part is a groove, and the bump is fitted in the groove when the step seat is in the retracted position.

14. The vehicle according to claim 13, wherein the bump has a cross section of one of a polygonal shape, a waist shape and a circular shape.

15. The vehicle according to claim 13, wherein each limiting part comprises a first groove and a second groove, and each engaging part comprises a first bump and a second bump; when the step seat is in the retracted position, the first bump is fitted in the first groove and the second bump is fitted in the second groove.

16. The vehicle according to claim 11, wherein the extension and retraction assembly comprises two linkage mechanisms, and the two linkage mechanisms are arranged at intervals along a length direction of the step seat.

17. The vehicle according to claim 16, further comprising a driving member connected to the linkage mechanisms to drive the linkage mechanisms to move.

18. The vehicle according to claim 11, wherein the extension and retraction assembly is detachably connected to the mounting seat and the step seat by a pin, and the extension and retraction assembly is rotatable relative to the mounting seat and the step seat.

19. A step device for a vehicle, comprising:
a mounting seat including a limiting part and configured to be mounted to a vehicle body of the vehicle;
a step seat comprising an engaging part;
a step mounted on the step seat; and
an extension and retraction assembly connected to the mounting seat and the step seat, the extension and retraction assembly being configured to drive the step seat to move between an extended position where the engaging part is separated from the limiting part and a retracted position where the engaging part is engaged with the limiting part;
wherein one of the limiting part and the engaging part is a bump, the other one of the limiting part and the engaging part is a groove, and the bump is fitted in the groove when the step seat is in the retracted position;
wherein the limiting part comprises a first groove and a second groove, and the engaging part comprises a first bump and a second bump; when the step seat is in the retracted position, the first bump is fitted in the first groove and the second bump is fitted in the second groove.

* * * * *